United States Patent Office 3,452,866
Patented July 1, 1969

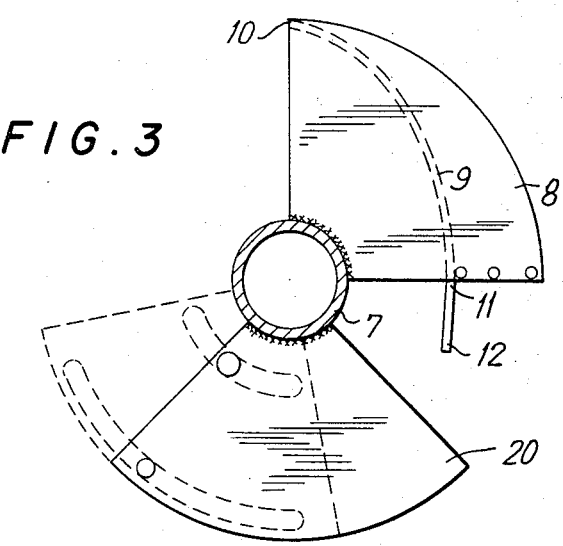
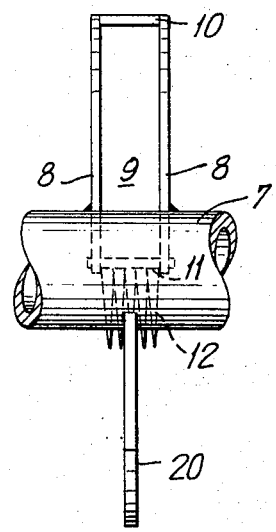
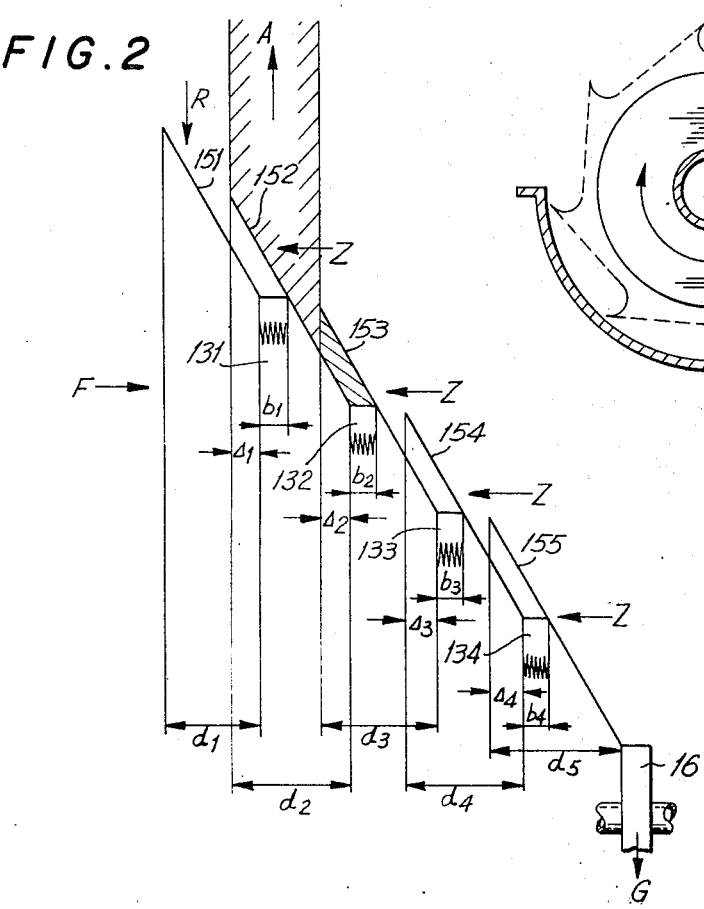
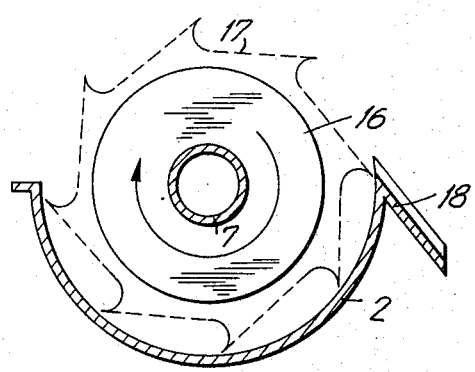

3,452,866
PROCESS AND APPARATUS FOR SEPARATING A MIXTURE OF PARTICLES INTO TWO END FRACTIONS
Theodor Eder, A–1030 Reisnerstrasse 32, Vienna, Austria
Filed Sept. 14, 1966, Ser. No. 579,330
Claims priority, application Austria, Sept. 20, 1965, A 8,579/65
Int. Cl. B03d 3/38, 3/02
U.S. Cl. 209—156                    23 Claims

ABSTRACT OF THE DISCLOSURE

The invention provides a process for separating a mixture of particles in accordance with the terminal settling velocity of the particles in a flowing fluid. The process is carried out in a plurality of stages involving releasing the mixture into a fluid flow having a horizontal component. The process comprises removing from the fluid flow as an end fraction the particles which settle in a final stage within a certain area. The particles which have settled in each preceding stage within a predetermined area are fed to respective predetermined locations. The particles fed to each of these predetermined locations are mechanically elevated and released into a succeeding stage. Fluid and another end fraction constituted by the particles entrained by the fluid are removed from the flow. The predetermined areas of at least two adjacent stages are in overlapping relationship.

---

Figure 1:
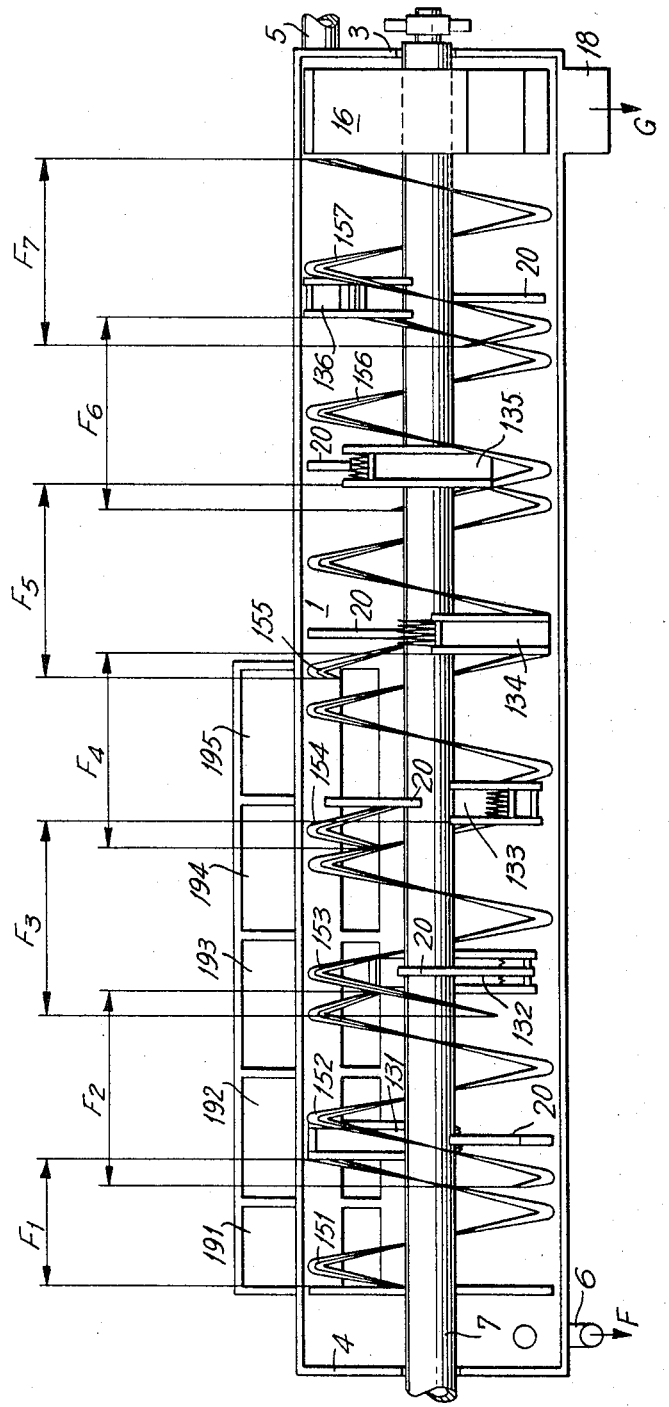

This invention relates to a process and apparatus for separating a feed mixture of particles into two end fractions in dependence on the terminal settling velocity of the particles in a flowing fluid.

A separation of a mixture of particles into a fine fraction and a coarse fraction is required in widely differing fields of technology. In foundry sands and in sands used in making glass, particles less than about 0.1 millimeter are undesirable because in foundry sands such particles adversely affect the permeability to gas, so that the castings must be rejected, and in glass-making sands such particles cause a formation of streaks in the glass. In the kaolin industry, the last trailings of hydrocyclones comprise fine sand waste, which contains about 10% kaolin. This kaolin should be recovered to a large extent before the sand is dumped.

For a virtually complete removal of fine particles from a mixture of particles to a residual content below 1%, a classifying process affording a high degree of separation is required. This high degree of separation is endeavored to be achieved in practice with the aid of a plurality of successive horizontal flow sedimentation processes, which give individually a low degree of separation. For instance, four to six separating stages are required for a single parting size.

A horizontal flow sedimentation process of this kind has been described in the Austrian patent specification No. 199,140. This process has only the disadvantage of requiring a relatively large rate of water circulation. It is also known to remove particles about 0.1 millimeter in diameter with the aid of multi-stage sand traps, which consist essentially of an elongated trough, which is divided into a plurality of compartments and is flown through by the liquid. Each compartment contains a screw conveyor, which pushes the sinks to an endless bucket conveyor, which raises the sinks and discharges them down a chute leading to the next succeeding compartment or as an end fraction out of the apparatus. The discharged sinks have travelled through the trough opposite to the direction of flow of the liquid. Such mechanical separators are highly expensive. They are restricted to a small number of stages and for this reason do not afford a sufficiently high degree of separation in many cases. Another important disadvantage resides in the fact that the parting size can be changed only within a small range in a given apparatus so that this apparatus cannot be adjusted to a significant extent to meet changing requirements.

It is an object of the invention to provide a process and an apparatus for accomplishing the object which has been set forth hereinbefore, namely, to obtain a high degree of separation with a relatively low water consumption, and to provide an apparatus which is simple in design so that it is reliable and inexpensive even when comprising a large number of separating stages.

In a process of the type mentioned first hereinbefore, in which the feed is introduced into a flow having a horizontal component, the settled particles are collected and conveyed opposite to the direction of flow and elevated at least once with the aid of an elevator at a predetermined station (elevating station) and released into the flow, and the settled particles of the last separating stage are discharged as one end fraction and the particles entrained by the flowing fluid are discharged as the other end fraction, this object is accomplished according to the invention in that particles settled within a predetermined settling area are fed to each elevating station and to the discharge station and the settling areas associated with at least elevating station and the adjacent elevating station or discharge station overlap in a marginal zone. This process can be carried out with an apparatus having an elongated trough, which has at one end a discharging device, such as an endless bucket conveyor, for discharging the settled particles which constitute the one end fraction, and which is provided with a feed inlet, a liquid inlet and an outlet, such as an overflow, for the entrained end fraction, and accommodates a feeder for feeding the settled particles to the discharging device and at least one elevator for elevating settled particles and for releasing said elevated particles into the flowing fluid, and a feeder which feeds the settled particles to the elevator, such as a screw conveyor or the like. According to the invention, adjacent feeders, which are associated with at least two elevators, or with the discharging device and the adjacent elevator, overlap in the axial direction in one section.

The invention will be explained more fully hereinafter with reference to an embodiment shown by way of example in the accompanying drawings. Further features of the invention will become apparent as the specification proceeds. In the diagrammatic drawing, FIG. 1 is a top plan view showing apparatus according to the invention, FIG. 2 is a flow diagram referred to in a discussion of the process according to the invention, FIG. 3 is an elevation of a rotary scoop as seen in an axial direction, FIG. 4 is an elevation showing said rotary scoop as seen in a direction at right angles to its axis, and FIG. 5 illustrates a discharging device in the form of an elevator wheel.

The apparatus shown in FIG. 1 comprises six separating stages and includes an elongated trough 1, which is generally semicircular in cross-section. The trough 1 includes a wall structure 2, which comprises merging bottom and side wall portions, and two end walls 3 and 4. An inlet 5 for added liquid, in most cases water, is attached to one end wall 3. An outlet 6 for liquid laden with particles of the fine end fraction is arranged close to the other end wall 4. The level of the inner opening of this outlet or the top edge of an overflow weir determines the liquid level within the trough. A shaft 7 is rotatably mounted in or outside the two side walls and has an axis which coincides with the axis of the semicylindrical bottom 2 of the trough. Six elevators 131–136 are accommodated within the trough. These elevators consist of spaced-apart rotary scoops, which are non-rotatably connected to the shaft. Each rotary scoop (FIGS. 3 and 4) consists of two side walls 8, which are connected to the shaft, e.g., by welding, and have the form of a sector of a circular ring having a center angle of, e.g., 90°, and a scoop bottom 9. The scoop bottom is generally spirally curved and secured at or close to its leading edge 10 to the side walls 8 and is held to said side walls at or close to its bottom edge 11. The connection near the trailing edge of the scoop bottom is effected, e.g., with bolts and nuts and is preferably releasable for an infinite or stepwise adjustment of the distance from the trailing edge to the axis of the shaft 7. A change of this distance results in a change of the height through which the particles slipping from the trailing edge must settle before they reach the bottom of the trough. The settling height has a significant influence on the parting size of each separating stage and of the entire separation process. Thus, the adjustment of the settling height by an adjustment of the trailing edges of the scoops enables a convenient determination or variation of the parting size of the entire process within a relatively large range. FIG. 3 illustrates three different mounting positions of the trailing edge. The scoop bottom is preferably provided with apertures in an area which immediately precedes the trailing edge, or provided with teeth 12 at the trailing edge. These two features result in a better dispersion of particles which have been picked up by the leading edge from the bottom of the trough and are released into the liquid across the trailing edge. The arrangement is such that the trailing edges of the scoops lie below the intended liquid level in the trough when particles are sliding across said trailing edges. In such an arrangement, particles cannot fall into the liquid from above the level and cause an undesired disturbance of the flow of the liquid.

The discharging device which is disposed at the inlet end of the trough comprises an elevator wheel 16, which is non-rotatably mounted on the shaft 7 and provided with buckets 17 having apertured walls (FIG. 5) so that liquid can be drained from the end fraction, which is discharged into a discharge chute 18.

Each rotating scoop and the elevator wheel has a feeder associated with it, which comprises a conveyor screw, which is narrow compared to the depth of the trough. The screws 151–157 are angularly spaced and overlap along an axial section like a double screw thread. The lead of the screws is such that they push the settled particles ahead in the longitudinal direction of the trough. The helical ribbons which constitute the screws are connected to the rotary scoops close to the leading edges of the latter so that such ribbons are only locally supported. It will be realized that the feeders need not consist of simple and continuous conveyor screws but may consist, e.g., of portions of screws or of individual inclined surfaces. It is only essential that they overlap in accordance with the invention.

Five inlets 191–195 are provided on one longitudinal side of the trough. The apparatus would also be operative if it had only a single inlet, e.g., the inlet 191. The provision of two or more inlets permits of a movement of the individual settled fractions in counterflow as well as other patterns.

The process according to the invention will now be discussed more fully with reference to FIG. 2, which illustrates the separating and conveying steps carried out in an apparatus which is in accordance with FIG. 1 but has four separating stages. The feed is introduced into the added liquid at position R, corresponding to inlet 191. The added liquid flows in the direction of arrow Z. Owing to the inadequate distribution of the feed, the latter settles virtually completely to the bottom of the trough, where it is engaged by the first feeder 151, which pushes the settled particles against the first rotary scoop 131. The scoop 131 elevates the particles and releases them across its trailing edge during a predetermined angle of the rotation of the scoop in a range which is spaced above the bottom of the trough so that the particles are dispersed. The area where this is effected may be described as dispersing area. The flow which acts on the particles diverts them from the vertical settling direction in dependence on the particle diameter and the velocity of flow. The action of the rotary scoop 131 is succeeded by that of the rotary scoop 132, which receives particles from the associated feeder 152 and engages said particles, elevates them and releases them into the flow. FIG. 2 shows that particles that have settled in the axial distance $d_2-\Delta_2$ with the exception of those elevated at $b_1$, are urged toward the next elevator 132 whereas particles which have settled in the area $\Delta_2$ may be by-passed around such elevator by the overlapping helices which bridge this elevator. The particles which have settled in the area having the width $b_2$ are elevated and re-dispersed into the flow. As adjacent feeders 152, 153; 153, 154; 154, 155 overlap along axial distances, the above remarks are also applicable to the rotary scoops 133 and 134 and the dispersion areas which are obtained with the aid of such scoops. It is a feature of the process according to the invention that sink particles which settle in at least two settling areas $F_1$, $F_2$ and/or $F_2$, $F_3$ and/or $F_3$, $F_4$ . . ., which are associated with at least two adjacent separating stages or with the last separating stage and the discharging device, are pushed ahead along separate paths along the bottom of the trough so that coarser particles are moved past an elevating or dispersion area and only fine solids are elevated and released into the flow in such area.

The settled particles fed by the feeder 155 to the elevator wheel 16 constitute a coarse end fraction G. The fine particles which have been entrained by the flowing fluid and discharged with the liquid from the outlet G constitute the fine end fraction F.

The use of rotary scoops as elevators permits of a rotary balance of the rotary system which is connected to the shaft. For this purpose it is sufficient to arrange the scoops, which are substantially identical, with an even angular spacing throughout the full angle.

It may be recommendable to prevent a formation of undesired accumulations of floating particles near the dispersion areas by increasing the velocity of flow in such areas. This end may be accomplished in two ways, which may be combined. Restrictors 20 (FIG. 3) may be provided, which locally restrict the cross-section of flow, or a plurality of small baffles may be provided, which are generally helical and spaced in trailing relationship from the trailing edge of a rotary scoop and connected to said scoop or to the shaft by a one-way coupling. Such baffles result in a local intensification of the flow within the range concerned. As is shown in FIG. 3, the restrictors may comprise a sector-shaped blade or two relatively adjustable blades, which can be connected in a selectable relative position. In the latter case, the center angle of the restrictor is adjustable within predetermined limits. It will be understood that the restrictors which are connected to the shaft have also an approximately regular angular spacing and may be utilized for providing an at least approximate rotary balance of the rotary system.

The usefulness of the process according to the invention will now be explained with reference to two examples.

*Example 1*

A six-stage sedimentation apparatus according to FIG. 1 was used. The apparatus had a total sedimentation area of two square meters and was fed per hour with 500 kilograms of a feed consisting of a kaolin slip and 700 liters of added water. 100 grams pyrophosphate per hour were added to the water for dispersing the kaolin in the slip. Of 100 parts of the feed, 88 parts belonged to the coarse end fraction (kaolin-free slip) and 12 parts to the fine fraction (kaolin for ceramic purposes). The feed and the two end fractions had the following sieve analyses:

| Particle diameter | Amount of solids in percent | | |
|---|---|---|---|
| | Feed | Coarse end fraction | Fine end fraction |
| More than 0.15 mm | 19 | 22 | |
| 0.1–0.15 mm | 45 | 51 | |
| 0.06–0.1 mm | 20 | 23 | 1 |
| 0.04–0.06 mm | 4 | 3 | 7 |
| 0.00–0.04 mm | 12 | 1 | 92 |

*Example 2*

The same sedimentation apparatus as above was fed per hour with 10 metric tons of sand for making concrete, which sand had passed through a sieve having a mesh size of 3 millimeters, together with 10 cubic meters of screening water and 10 cubic meters of added water. The rotational speed was much higher than in Example 1. The coarse end fraction contained 75% and the fine end fraction 25% of the particulate solids of the feed.

| Particle diameter | Amount of solids in percent | | |
|---|---|---|---|
| | Feed | Coarse end fraction | Fine end fraction |
| More than 3 mm | 2 | 3 | |
| 1–3 mm | 46 | 60 | |
| 0.4–1 mm | 10 | 13 | |
| 0.2–0.4 mm | 15 | 17 | 6 |
| 0.1–0.2 mm | 21 | 6 | 71 |
| 0.0–0.1 mm | 6 | 1 | 23 |

These examples indicate a high degree of separation of particles having a diameter above a predetermined parting size with from the fine end fraction. This result has been accomplished with a low consumption of added water and a small apparatus having a total sedimentation area of only 2 square meters. The total sedimentation area is the area of the horizontal projection of the effective trough sections.

Apparatus according to the invention are driven by a change-speed transmission which can rotate the speed at different adjusted speeds.

What is claimed is:

1. A process of separating a feed mixture of particles in dependence on the terminal settling velocity of the particles in a flowing fluid, which process is carried out in a plurality of stages, each of which comprises releasing the feed mixture into a fluid flow having a horizontal component, removing from said fluid flow as one end fraction the particles which have settled in a final stage within a predetermined area, feeding to respective predetermined locations at least a portion of the particles which have settled in each preceding stage within a perdetermined area, mechanically elevating the particles fed to each of said predetermined locations, releasing said elevated particles into the succeeding stage below the fluid level therein, and removing fluid and, as the other end fraction, the particles entrained thereby, from said flow, said predetermined areas of at least two adjacent ones of said stages overlapping.

2. A process as set forth in claim 1, in which said predetermined areas of said final stage and of the stage immediately preceding said final stage overlap.

3. A process as set forth in claim 1, in which said predetermined areas of two of said preceding stages overlap.

4. A process as set forth in claim 1, which comprises dispersing said particles as they are released into said flow and increasing the velocity of said flow in each area in which particles are dispersed and released into said flow compared to adjacent areas of said flow.

5. A process as set forth in claim 1, in which said particles are dispersed as they are released into said flow, the areas in which said particles are dispersed and released into said flow are laterally staggered with respect to the general direction of said fluid flow, and said fluid flow is compelled to follow a meandering course.

6. A process as set forth in claim 5, in which the velocity of said flow is increased in each area in which particles are dispersed and released into said flow compared to adjacent areas of said flow.

7. A process as set forth in claim 1, in which the parting size is controlled by adjusting the settling height of the particles in each of the areas where the particles are released into said flow.

8. Apparatus for separating a feed mixture of particles in dependence on their terminal settling velocity in a liquid flow, said apparatus comprising an elongated trough, a discharging device disposed at one end of said trough, a feed inlet for supplying said feed mixture into said trough, a liquid inlet adjacent said one end for supplying added liquid into said trough, an outlet for withdrawing added liquid and, as one end fraction, particles entrained by said added liquid from said trough, at least two elevators disposed between said feed inlet and said one end of said trough, and a plurality of feeders, which are respectively associated with said discharging device and each of said elevators and adapted to receive particles which have settled in said trough, at least two adjacent ones of said feeders overlapping in their axial directions to provide a by-pass bridging the associated elevator, each of said elevators being operable to receive particles from the associated feeder and to elevate said particles and to release them into said added liquid in said trough, said outlet being disposed to maintain the liquid in the trough at a level above that at which the particles are released by the elevators, said liquid inlet being spaced from the outlet, the discharging device disposed at the said end of the trough being operable to receive at least a portion of the particles from the associated feeder and remove them as another end fraction from said trough.

9. Apparatus as set forth in claim 8, in which said discharging device comprises an endless bucket conveyor.

10. Apparatus as set forth in claim 8, in which each of said feeders comprise a screw conveyor.

11. Apparatus as set forth in claim 8, in which said outlet comprises an overflow.

12. Apparatus as set forth in claim 8, in which at least one of said elevators comprises a rotary scoop having a leading edge for receiving particles and an adjustable trailing edge for releasing said particles in a predetermined range of positions of said scoop below the level of liquid in said trough.

13. Apparatus as set forth in claim 12, in which a plurality of said elevators comprise such rotary scoop and the feeders associated with said rotary scoops comprise angularly spaced conveyor screws, which extend one into the other like multiple screw threads along an axial section.

14. Apparatus as set forth in claim 12, in which a plurality of said elevators comprise such rotary scoop and the feeders associated with said rotary scoops are composed of portions of angularly spaced conveyor screws, which portions extend one into the other like multiple screw threads along an axial section.

15. Apparatus as set forth in claim 12, characterized in that said rotary scoop is mounted on a shaft and comprises two congruent, sector-shaped, parallel side walls which are connected to said shaft, and a bottom, said side walls have two radial edges, one of which has a corner which is nearest to said trough, and said bottom extends from said corner spirally to a point of the other radial edge and is adjustable to vary the distance of said point from said shaft.

16. Apparatus as set forth in claim 15, in which said bottom is formed with said trailing edge and adjacent to said trailing edge is designed to disperse said particles as they are released.

17. Apparatus as set forth in claim 16, in which said trailing edge is serrated.

18. Apparatus as set forth in claim 16, in which said bottom has an apertured portion which adjoins said trailing edge.

19. Apparatus as set forth in claim 8, which comprises means for increasing the velocity of flow at least adjacent to one area where said particles are released into said added liquid, said means comprising a baffle arranged to divert said flow toward said area.

20. Apparatus as set forth in claim 8, which comprises means for increasing the velocity of flow adjacent to at least one area where said particles are released into said added liquid, said means comprising a restrictor which reduces the cross-section of flow.

21. Apparatus as set forth in claim 20, in which at least one of said elevators comprises a rotary scoop having a leading edge for receiving particles and a trailing edge adapted to release said particles in a predetermined range of positions of said scoop and said outlet is arranged to maintain the level of liquid in said trough above the level at which said scoop is in said predetermined position, said scoop is mounted on a shaft and said restrictor comprises a sector member, which is non-rotatably mounted on said shaft and angularly spaced from said scoop.

22. Apparatus as set forth in claim 20, in which at least one of said restrictors comprises two sector-shaped vanes, which are relatively movable to vary the center angle of said restrictor.

23. Apparatus as set forth in claim 20, in which a plurality of said elevators comprise a rotary scoop having a leading edge for receiving particles and a trailing edge adapted to release said particles in a predetermined range of positions of said scoop and said outlet is arranged to maintain the level of liquid in said trough above the level at which said scoop is in said predetermined position and which comprises a plurality of said restrictors and in which said scoops and restrictors are mounted for joint rotation and form parts of a rotor, said scoops being regularly angularly spaced and said restrictors being regularly angularly spaced so that said rotor is at least approximately rotationally balanced.

References Cited

UNITED STATES PATENTS

| 17,385 | 5/1857 | Martin | 209—464 |
| 242,035 | 5/1881 | Peirce | 209—464 X |
| 968,883 | 8/1910 | Randolph | 209—464 |
| 1,824,688 | 9/1931 | Rigler | 209—452 |
| 2,044,775 | 6/1936 | Dreifus | 209—473 X |

FOREIGN PATENTS

| 1,236,562 | 6/1960 | France. |

FRANK W. LUTTER, *Primary Examiner.*

U.S. Cl. X.R.

209—464